(12) United States Patent
     Oliver (10) Patent No.: US 11,155,482 B2
(45) Date of Patent: Oct. 26, 2021

(54) APPARATUS AND METHOD FOR AERATING WASTEWATER

(71) Applicant: Somerset Environmental Solutions Inc., Warrendale, PA (US)

(72) Inventor: James D. Oliver, Pittsburgh, PA (US)

(73) Assignee: Somerset Environmental Solutions Inc., Sewickley, PA (US)

( * ) Notice: Subject to any disclaimer, the term of this patent is extended or adjusted under 35 U.S.C. 154(b) by 450 days.

(21) Appl. No.: 15/945,188

(22) Filed: Apr. 4, 2018

(65) Prior Publication Data
US 2019/0308894 A1    Oct. 10, 2019

(51) Int. Cl.
| | |
|---|---|
| *C02F 1/74* | (2006.01) |
| *C02F 3/20* | (2006.01) |
| *B01F 3/04* | (2006.01) |
| *C02F 101/20* | (2006.01) |
| *C02F 101/30* | (2006.01) |

(52) U.S. Cl.
CPC ............ *C02F 1/74* (2013.01); *B01F 3/04241* (2013.01); *C02F 3/20* (2013.01); *B01F 2003/0439* (2013.01); *B01F 2003/04872* (2013.01); *B01F 2215/0052* (2013.01); *C02F 2101/203* (2013.01); *C02F 2101/30* (2013.01)

(58) Field of Classification Search
CPC .............. B01F 3/04241; B01F 3/04248; B01F 2215/0052; B01F 2003/0439; B01F 2003/04872; B01F 13/10; B01F 3/04496; B01F 3/0451; B01F 5/0603; B01F 5/0065; C02F 1/74; C02F 2101/30; C02F 3/20; C02F 2101/203; C02F 2301/026; Y02W 10/10

See application file for complete search history.

(56) References Cited

U.S. PATENT DOCUMENTS

| | | | |
|---|---|---|---|
| 2,820,620 A | 1/1958 | Anderson | |
| 3,051,315 A | 8/1962 | Boester | |
| 3,054,602 A * | 9/1962 | Produman | ............... C02F 3/121 261/21 |
| 3,289,608 A * | 12/1966 | Laval, Jr. | ............... E21B 43/38 166/105.1 |
| 3,841,997 A | 10/1974 | McGee | |
| 3,925,208 A * | 12/1975 | Yost | ..................... C02F 3/1242 210/199 |

(Continued)

FOREIGN PATENT DOCUMENTS

| | | |
|---|---|---|
| CN | 204417223 U | 6/2015 |
| KR | 100828545 B1 | 5/2008 |

(Continued)

OTHER PUBLICATIONS

"Supervent" published Nov. 2008 (Year: 2008).*

(Continued)

*Primary Examiner* — Stephen Hobson
(74) *Attorney, Agent, or Firm* — The Webb Law Firm (57) ABSTRACT

An aeration apparatus including a tank defining a cavity to receive a liquid, at least one aerator positioned within the tank, and a plenum connected to a bottom surface of the tank and in fluid communication with the at least one aerator, in which an air flow is directed from the plenum into the at least one aerator to deliver air to the liquid in the tank to oxidize the fluid.

17 Claims, 7 Drawing Sheets

(56) References Cited

U.S. PATENT DOCUMENTS

| | | | |
|---|---|---|---|
| 4,081,368 A * | 3/1978 | Block | C02F 3/121 210/628 |
| 4,325,823 A * | 4/1982 | Graham | C02F 3/301 210/86 |
| 4,468,327 A * | 8/1984 | Brown | C02F 3/1294 210/626 |
| 5,091,315 A * | 2/1992 | McCarty | C02F 3/28 210/320 |
| 5,273,664 A | 12/1993 | Schulz | |
| 5,316,671 A | 5/1994 | Murphy | |
| 5,435,914 A * | 7/1995 | Bernhardt | C02F 3/02 210/220 |
| 6,033,562 A * | 3/2000 | Budeit | C02F 7/00 210/199 |
| 6,200,470 B1 * | 3/2001 | Romero | B01D 21/0042 210/170.06 |
| 6,260,831 B1 | 7/2001 | Jäger | |
| 6,482,322 B1 * | 11/2002 | Tsigonis | C02F 3/02 210/620 |
| 6,488,851 B1 * | 12/2002 | Almog | C02F 3/02 210/605 |
| 7,022,236 B2 | 4/2006 | Liu et al. | |
| 7,476,322 B2 * | 1/2009 | Dimitriou | B01D 61/145 210/615 |
| 7,571,899 B2 * | 8/2009 | Kitasako | B01F 1/0022 210/220 |
| 8,500,107 B2 | 8/2013 | Magen | |
| 9,156,718 B2 * | 10/2015 | Silva | C02F 3/20 |
| 9,718,034 B1 * | 8/2017 | Lai | B01F 7/00916 |
| 2003/0042199 A1 | 3/2003 | Smith | |
| 2008/0142424 A1 * | 6/2008 | Kitasako | B01F 1/0022 210/188 |
| 2008/0290043 A1 * | 11/2008 | Kerfoot | B01F 3/04262 210/747.8 |
| 2010/0044322 A1 * | 2/2010 | Fujisato | C02F 1/74 210/758 |
| 2010/0300965 A1 | 12/2010 | Sakai et al. | |
| 2016/0256831 A1 * | 9/2016 | Cumin | B01D 63/043 |
| 2018/0296989 A1 * | 10/2018 | Vlahogeorge | B01F 3/04517 |
| 2019/0337827 A1 * | 11/2019 | Oliver | C02F 3/20 |
| 2020/0360873 A1 * | 11/2020 | Tharp | B01F 3/04241 |

FOREIGN PATENT DOCUMENTS

| | | | | |
|---|---|---|---|---|
| WO | WO-02068103 A1 * | 9/2002 | | B01F 5/0473 |
| WO | 2017180343 A1 | 10/2017 | | |

OTHER PUBLICATIONS

WIPO translation of Hideto et al. WO 02/068103 (Year: 2002).*
"Welding" Wikipedia published Sep. 18, 2016 accessed at <https://en.wikipedia.org/w/index.php?title=Welding&oldid=739989236> (Year: 2016).*

* cited by examiner

APPARATUS AND METHOD FOR AERATING WASTEWATER

BACKGROUND OF THE INVENTION

Field of the Invention

The present invention relates to an apparatus for mixing of liquids and gases and, more particularly, to an apparatus and method for wastewater aeration treatment.

Description of Related Art

Many different types of aerators are used for a variety of diverse needs and processes. Several such aerators are used for wastewater treatment. However, many of these aerators have disadvantages to them that do not provide the most efficient aeration of the wastewater.

Surface aerators have motor driven propellers that are anchored in place on the surface of basins or ponds to agitate waste liquid in order to infuse oxygen. Most surface aerators in use require 25 to 100 horsepower for each motor and most installations have multiple units to fulfill the full aeration requirements. High-energy consumption makes these aerators significantly expensive to operate and maintain at a worksite. Surface aerators also have many moving parts and components in direct contact with the wastewater that is being aerated. This can cause significant downtime and high maintenance costs. Due to the surface aerators' size, their weight and placement in large bodies of water provides another disadvantage in requiring crane-type equipment to remove the surface aerators for maintenance, repair, or replacement.

Fine bubble aerator systems are another type of water aeration device. This type of aeration device is placed at the bottom of basins with limiting water depths of 13 to 16 feet. The depth at which these units can operate requires relatively high pressures to overcome the overlying weight of the water. High pressure translates into high-energy consumption, which translates into higher costs. The openings in the fine bubble aerators that discharge air into the water are often miniscule in size and not very effective. This often leads to clogging of these small holes.

Another type of aeration device is a sparging ring. Sparging rings are placed at the bottom of basins at depths of 13 to 16 feet. Sparging rings require relatively high pressure input and therefore require high energy usage contributing to high operating costs. Turbines are used with these devices to break up the size of the air bubbles and to mix the large volumes of liquid contained within the basin. Turbines are high-energy consumption devices, with moving parts in direct contact with the waste liquid, and requires continual maintenance.

An aspiration stripper is another type of aeration device. This type of aeration aspirates the surrounding air. Liquid to be aerated is pumped through a plurality of orifices within the unit. In order to aspirate the air, liquid is pumped through these devices at pressures that may exceed 50 psi. High pressures require high energy inputs, which translates to high costs. The small, elongated orifices in the units make them susceptible to clogging. Pre-filtering is often required in this aeration device. This type of aeration device is limited in the amount of aspirated air that is available to transfer oxygen into the liquid. When a process has a high oxygen demand, this type of device often has to recycle pre-processed liquid. The susceptibility to clogging, high energy consumption, and recycling requirement in high oxygen transfer applications are several disadvantages of the aspiration stripper.

Another type of aeration device is disclosed in U.S. Pat. No. 6,033,562 to Budeit, the disclosure of which is incorporated by reference in its entirety. This type of aeration device is configured for a single pass mass transfer of oxygen into a liquid. Individual aeration modules allow a continuous flow of liquid to be permeated with oxygen as it passes through a successive series of reaction chambers. The continuous flow of liquid is first introduced into an infusion chamber from a pressurized or gravity flow source. The continuous flow of liquid passes under the baffle and rises in an adjacent reaction chamber. Oxygen is introduced into the reaction chamber by a series of vertical tubes and is transferred into the continuous flow of liquid. The flow of liquid is then propelled over another baffle into a discharge chamber. The aeration device may also introduce chemical reagents into the chambers to break down oil components in the flow of liquid.

SUMMARY OF THE INVENTION

In view of the foregoing disadvantages with current aeration devices, a need exists for a cost-efficient, reliable wastewater aeration device and method that overcome the shortcomings of the existing aeration devices.

In one aspect of the present disclosure, an aeration apparatus may include a tank defining a cavity to receive a liquid, at least one aerator positioned within the tank, and a plenum connected to a bottom surface of the tank and in fluid communication with the at least one aerator, in which an air flow is directed from the plenum into the at least one aerator to deliver air to the liquid in the tank to oxidize the fluid.

In another aspect of the present disclosure, the at least one aerator may include an inner delivery tube and an outer aeration tube. The inner delivery tube may be connected to a hole defined in the bottom surface of the tank to establish fluid communication with the plenum. The inner delivery tube may define at least one aperture to establish fluid communication between the plenum and the outer aeration tube. The at least one aperture may be defined in a top end of the inner delivery tube. A flow-directing band may be positioned on the outer aeration tube to create a counter-clockwise swirl in the liquid surrounding the outer aeration tube. The outer aeration tube may be connected to the inner delivery tube via a cap and stud arrangement. The outer aeration tube may be welded to the bottom surface of the tank.

In another aspect of the present disclosure, an aeration apparatus may include a tank defining a cavity to receive a volume of liquid, at least one compartment wall positioned within the tank to define a reaction chamber therein, at least one aerator positioned within the reaction chamber, and a plenum connected to the tank and fluidly connected to the at least one aerator.

In another aspect of the present disclosure, the at least one compartment wall may include a first compartment wall and a second compartment wall defining the reaction chamber therebetween. The first compartment wall may extend from a bottom surface of the tank. The second compartment wall may extend from a top surface of the tank. An aeration source may be fluidly connected to the plenum to direct an air flow into the plenum. The aeration apparatus may be portable between different locations or worksites. A non-aeration chamber may be defined between the at least one compartment wall and a sidewall of the tank. The at least one aerator may include an inner delivery tube and an outer aeration tube. The at least one aerator may include a flow-directing band to create a counter clockwise swirl in the liquid surrounding the at least one aerator. The at least one aerator may include three aerators arranged in a line within the reaction chamber.

In another aspect of the present disclosure, a method of aerating wastewater may include positioning an aeration apparatus within a wastewater source; directing the wastewater into the aeration apparatus; directing an air flow into a plenum positioned within the aeration apparatus; directing the air flow from the plenum into at least one aerator positioned within the aeration apparatus; and directing the air flow from the at least one aerator into a cavity defined by the aeration apparatus to aerate the wastewater held in the aeration apparatus.

In another aspect of the present disclosure, the method may also include directing the air flow from the at least one aerator to the cavity comprises directing the air flow from an inner delivery tube of the at least aerator to an outer aeration tube of the at least one aerator. Directing air flow from the at least one aerator into the cavity may include creating a counter clockwise swirl in the wastewater held near the at least one aerator.

Further aspects will now be described in the following numbered clauses.

Clause 1: An aeration apparatus, comprising: a tank defining a cavity to receive a liquid; at least one aerator positioned within the tank; and a plenum connected to a bottom surface of the tank and in fluid communication with the at least one aerator, wherein an air flow is directed from the plenum into the at least one aerator to deliver air to the liquid in the tank to oxidize the fluid.

Clause 2: The aeration apparatus as recited in Clause 1, wherein the at least one aerator comprises an inner delivery tube and an outer aeration tube.

Clause 3: The aeration apparatus as recited in Clause 2, wherein the inner delivery tube is connected to a hole defined in the bottom surface of the tank to establish fluid communication with the plenum.

Clause 4: The aeration apparatus as recited in Clause 2 or 3, wherein the inner delivery tube defines at least one aperture to establish fluid communication between the plenum and the outer aeration tube.

Clause 5: The aeration apparatus as recited in Clause 4, wherein the at least one aperture is defined in a top end of the inner delivery tube.

Clause 6: The aeration apparatus as recited in any of Clauses 2-5, wherein a flow-directing band is positioned on the outer aeration tube to create a counter-clockwise swirl in the liquid surrounding the outer aeration tube.

Clause 7: The aeration apparatus as recited in any of Clauses 2-6, wherein the outer aeration tube is connected to the inner delivery tube via a cap and stud arrangement.

Clause 8: The aeration apparatus as recited in any of Clauses 2-7, wherein the outer aeration tube is welded to the bottom surface of the tank.

Clause 9: An aeration apparatus, comprising: a tank defining a cavity to receive a volume of liquid; at least one compartment wall positioned within the tank to define a reaction chamber therein; at least one aerator positioned within the reaction chamber; and a plenum connected to the tank and fluidly connected to the at least one aerator.

Clause 10: The aeration apparatus as recited in Clause 9, wherein the at least one compartment wall comprises a first compartment wall and a second compartment wall defining the reaction chamber therebetween.

Clause 11: The aeration apparatus as recited in Clause 10, wherein the first compartment wall extends from a bottom surface of the tank; and wherein the second compartment wall extends from a top surface of the tank.

Clause 12: The aeration apparatus as recited in any of Clauses 9-11, further comprising an aeration source fluidly connected to the plenum to direct an air flow into the plenum.

Clause 13: The aeration apparatus as recited in any of Clauses 9-12, wherein the aeration apparatus is portable between different locations or worksites.

Clause 14: The aeration apparatus as recited in any of Clauses 9-13, wherein a non-aeration chamber is defined between the at least one compartment wall and a sidewall of the tank.

Clause 15: The aeration apparatus as recited in any of Clauses 9-14, wherein the at least one aerator comprises an inner delivery tube and an outer aeration tube.

Clause 16: The aeration apparatus as recited in any of Clauses 9-15, wherein the at least one aerator comprises a flow-directing band to create a counter clockwise swirl in the liquid surrounding the at least one aerator.

Clause 17: The aeration apparatus as recited in any of Clauses 9-16, wherein the at least one aerator comprises three aerators arranged in a line within the reaction chamber.

Clause 18: A method of aerating wastewater, comprising: positioning an aeration apparatus within a wastewater source; directing the wastewater into the aeration apparatus; directing an air flow into a plenum positioned within the aeration apparatus; directing the air flow from the plenum into at least one aerator positioned within the aeration apparatus; and directing the air flow from the at least one aerator into a cavity defined by the aeration apparatus to aerate the wastewater held in the aeration apparatus.

Clause 19: The method as recited in Clause 18, wherein directing the air flow from the at least one aerator to the cavity comprises directing the air flow from an inner delivery tube of the at least aerator to an outer aeration tube of the at least one aerator.

Clause 20: The method as recited in Clause 18 or 19, wherein directing the air flow from the at least one aerator into the cavity comprises creating a counter clockwise swirl in the wastewater held near the at least one aerator.

These and other features and characteristics of the aeration apparatus, as well as the method of aeration, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DESCRIPTION OF THE INVENTION

For purposes of the description hereinafter, the terms "upper", "lower", "right", "left", "vertical", "horizontal", "top", "bottom", "lateral", 'longitudinal", and derivatives thereof shall relate to the invention as it is oriented in the figures. However, it is to be understood that the invention may assume alternative variations and step sequences, except where expressly specified to the contrary. It is also to be understood that the specific devices and processes illustrated in the attached drawings, and described in the following specification, are simply exemplary aspects of the invention. Hence, specific dimensions and other physical characteristics related to the aspects disclosed herein are not to be considered as limiting.

With reference to FIGS. 1-8, the aeration apparatus 2 of the present disclosure uses mechanically generated air flow at high volumes to infuse air into liquid, to change the chemical nature of the liquid. Fluid, liquid, wastewater, and water are used interchangeably throughout this disclosure and hold the same relative meaning for this invention.

Figure 1:
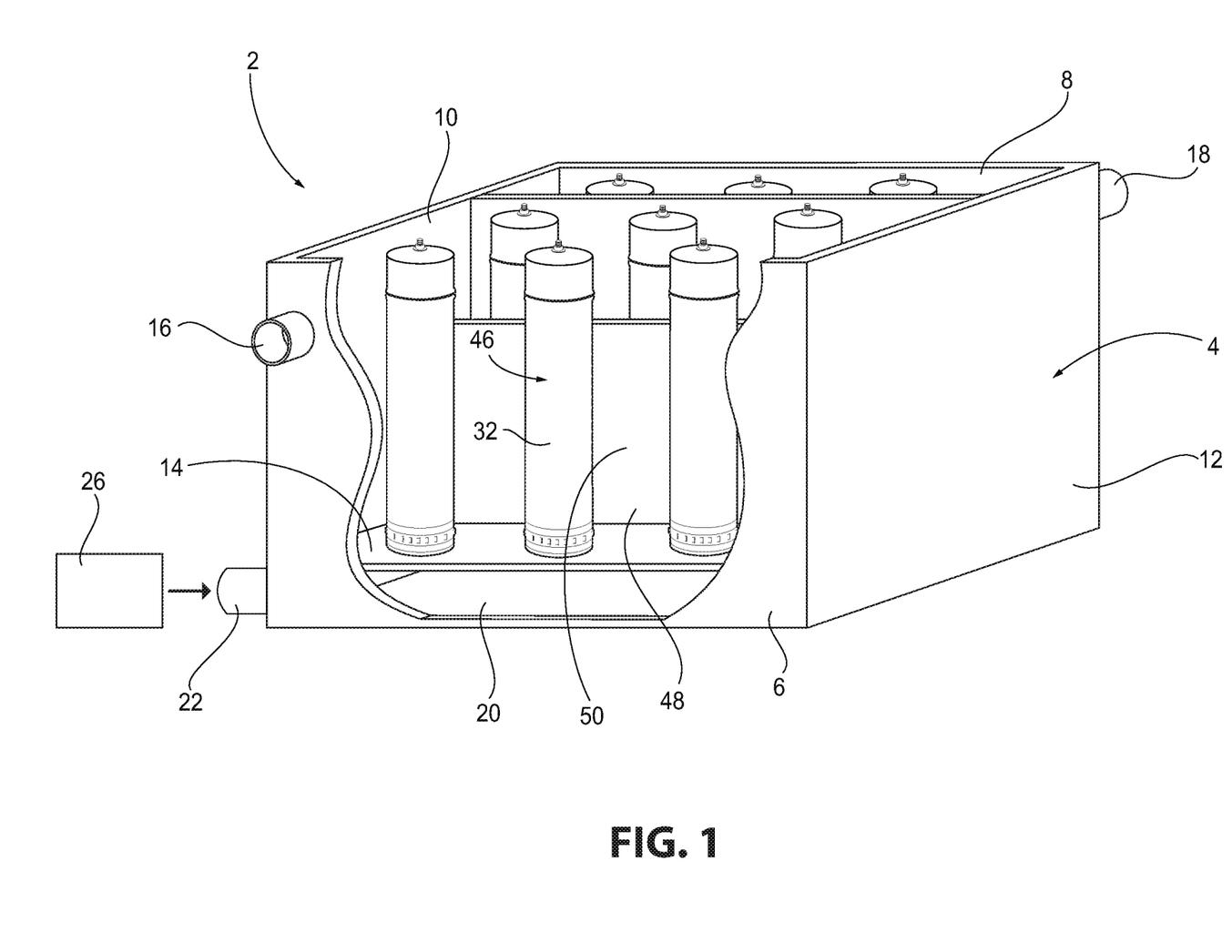
FIG. 1 is a front perspective view of an aeration apparatus in accordance with one aspect of the present disclosure with a portion of a front wall removed.
Figure 2:
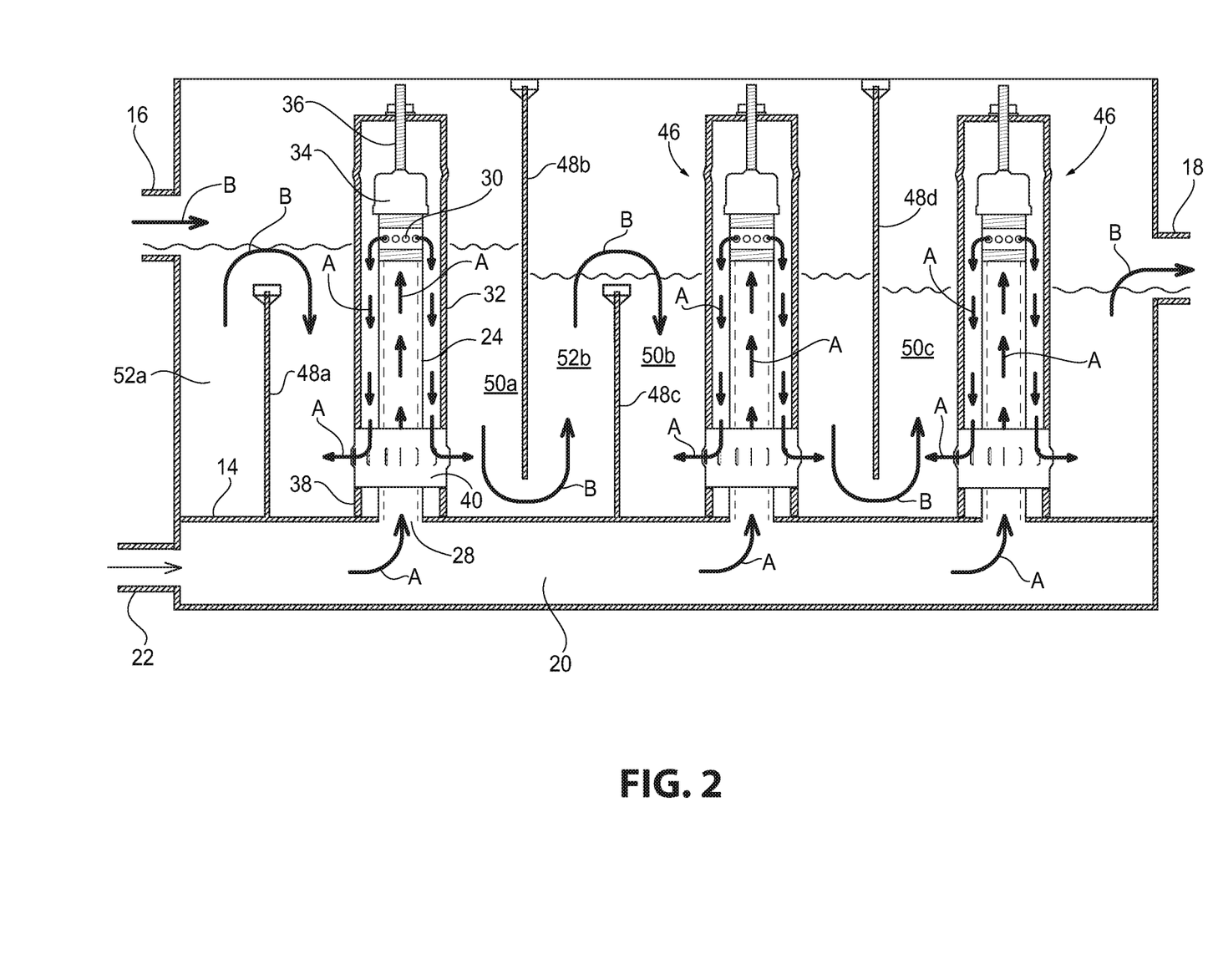
FIG. 2 is a cross-sectional view of the aeration apparatus of FIG. 1.
Figure 3:
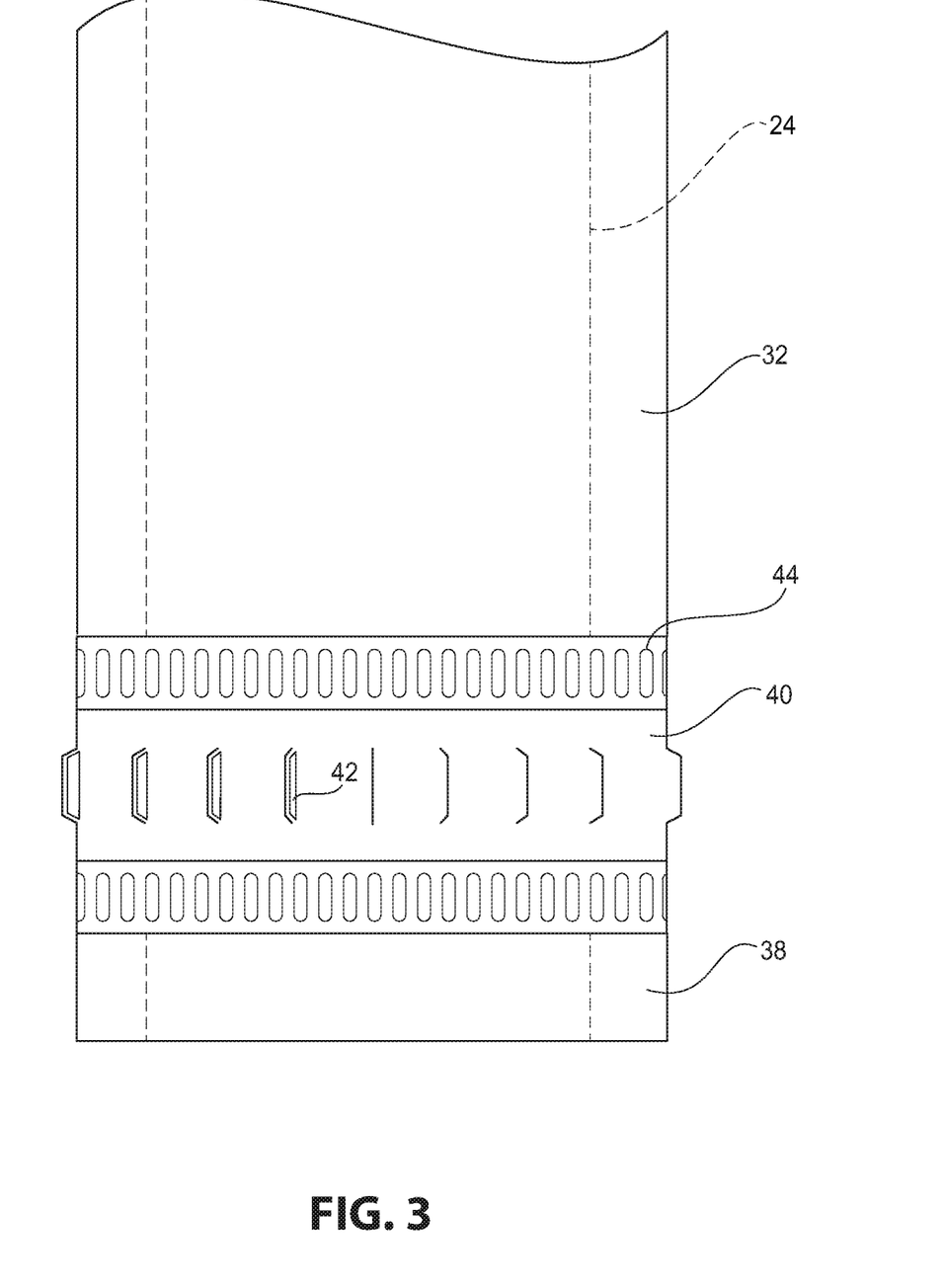
FIG. 3 is a front view of an aerator used in the aeration apparatus of FIG. 1.
Figure 4:
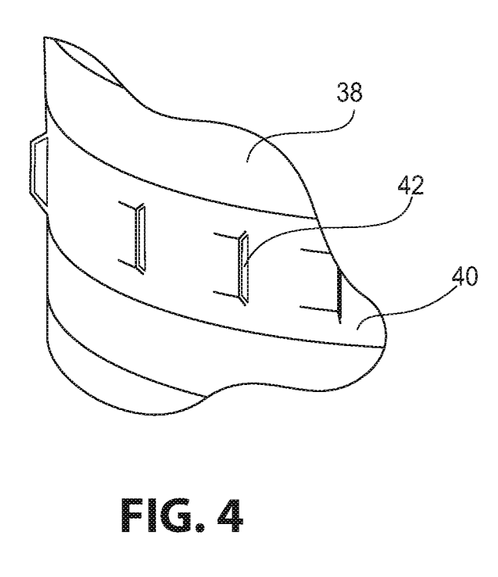
FIG. 4 is an isolated view of the aerator of FIG. 3.
Figure 5:
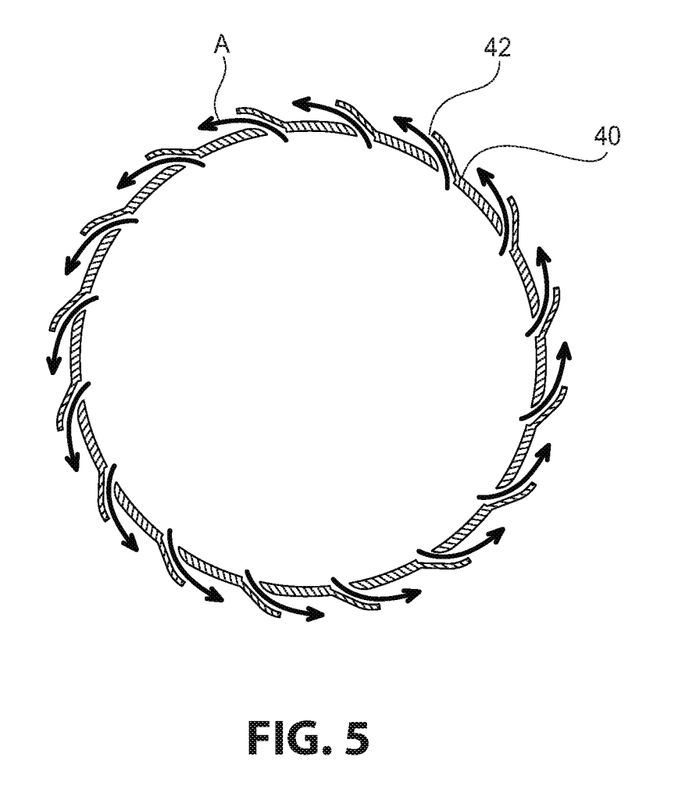
FIG. 5 is a schematic bottom view depicting a flow of fluid created by the aerator of FIG. 3.

With reference to FIGS. 1 and 2, the aeration apparatus 2 is configured to transfer liquids, such as wastewater, into and through a tank 4. In one aspect, the tank 4 may be substantially rectangular in shape. The tank 4 may include a front wall 6, a rear wall 8, and two side walls 10, 12. The walls 6, 8, 10, 12 are connected to one another so as to form a substantially rectangular housing that defines an inner cavity for the tank 4. It is also contemplated that the tank 4 may have an alternative shape, such as square, triangular, oval, and circular, among others. The tank 4 is designed and configured to be transportable between wastewater sources such that an operator can install and remove the tank 10 at different work sites, as needed. A bottom surface 14 may be provided at the bottom surface of each wall 6, 8, 10, 12, thereby defining the cavity in the tank 4. The tank 4 receives the liquid through an inlet 16, allows the liquid to gravity-flow through aeration or reaction chambers within the tank 4, and is eventually discharged through an outlet 18. In one aspect, the tank 4 may have approximate dimensions of ten (10) feet long by eight (8) feet wide by five (5) feet high.

In one aspect, an airtight chamber, referred to as a plenum 20, is directly connected to the bottom surface 14 of the tank 4, and has the same dimensions as the tank 4, with a thickness of approximately six (6) inches. The plenum 20 receives forced air through an inlet or receiving manifold 22 and allows an equal flow of air A to be distributed into inner delivery tubes 24 provided in the tank 4. The plenum 20 may include a single air inlet port 22 that receives forced air from an aeration source, such as a scroll blower 26. Once air is forced into the plenum 20, the air is dispersed throughout the entire chamber defined by the plenum 20 and forced out through holes or ports 28 defined in the bottom surface 14 of the tank 4 and leading to one of the inner delivery tubes 24. In one aspect, the ports 28 may be approximately three (3) inches in diameter. In one aspect, each delivery tube 24 is welded to the bottom surface 14 of the tank 4 and into the plenum 20. The delivery tube 24 is of sufficient height to extend above the water level within the tank 4, with a height of approximately four (4) feet. A top end of the delivery tube 24 defines holes 30 for delivery of the forced air safely above the water level to keep water from re-entering the plenum 20. The delivery tube 24 allows the forced air to feed into an outer aeration tube 32.

In one aspect, each outer aeration tube 32 is approximately eight (8) inches in diameter and bolts onto the inner delivery tube 24 using a treaded cap 34 with a stud 36 on the top end of the inner delivery tube 24. The cap 34 is rotatably attached to the top end of the inner delivery tube 24 and the stud 36 extends from the cap 34 through a top surface of the outer aeration tube 32, where the stud 36 is secured thereto with a cap nut. The cap 34 of the inner delivery tube 24 may be removable for replacement if damaged. The air is forced from the holes 30 of the inner delivery tube 24 and down into the outer aeration tube 32. The air is then forced out of a base 38 of the outer aeration tube 32.

Figure 6:
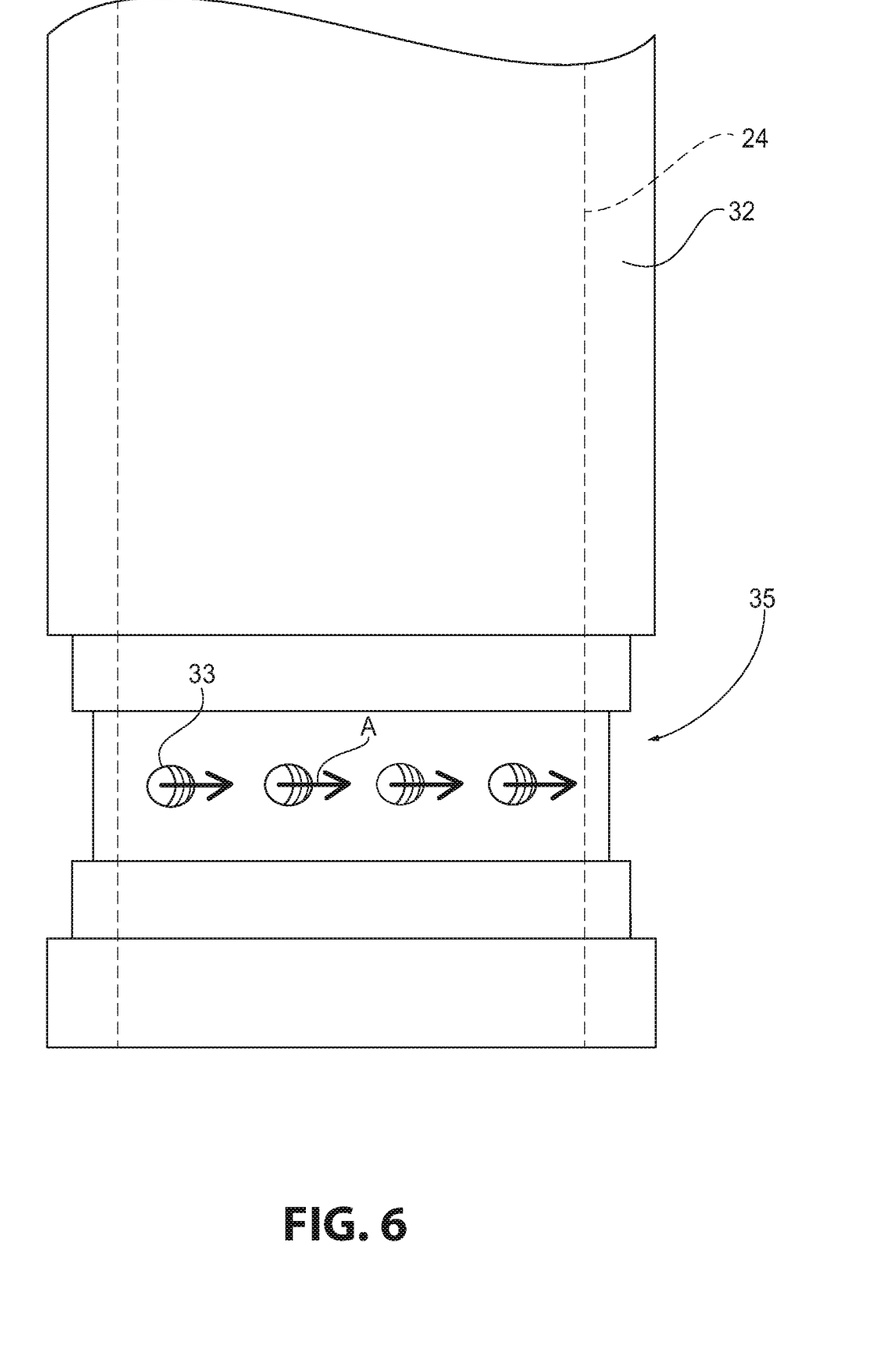
FIG. 6 is a front view of the aerator of FIG. 3 with a flow-directing band removed therefrom.

With reference to FIGS. 2-5, the base 38 of the outer aeration tube 32 may also be welded onto the bottom surface 14 of the tank 4. In one aspect, the base 38 of each outer aeration tube 32 includes a flow-directing band 40 fastened thereto. As shown in FIG. 6, each outer aeration tube 32 defines a plurality of holes 33 that are positioned in a recess 35 defined in the base 38 of the outer aeration tube 32. The band 40 is positioned within the recess 35 to direct the flow of air in a counter clockwise direction relative to the outer aeration tube 32. The flow-directing band 40 may be made of stainless steel and may be clamped, in flush contact, to the base 38 of the outer aeration tube 32 to initiate natural air flow in a typically counter clockwise direction. The counter clockwise direction of the air flow may send the liquid in a similar counter clockwise direction to create a continuous swirling motion of air. This agitation process of the air flow causes the natural air to remain longer in the liquid and causes the water to surge from one aeration chamber into the next. The band 40 may define a plurality of apertures 42 arranged in a circumferential outer surface of the band 40. The air flow from the outer aeration tube 32 is forced out of the apertures 42 to create a swirling flow of air flow and oxygen around the outer aeration tube 32. The band 40 may be clamped to the base 38 of the outer aeration tube 32 using one or more hose clamps 44. Air flow that is directed out of the holes 33 in the outer aeration tube 32 is directed through the apertures 42 defined in the band 40.

The band 40 may be a stainless steel band approximately three (3) inches wide and $\frac{1}{16}$-inches thick that is clamped on the base 38 to direct aeration flow in a specific or predetermined direction. The apertures 42 defined in the band 40 create finer air bubbles, which greatly assists in the oxidization of the liquids. The apertures 42 have a depressed leading edge and a raised tail exit edge. The leading edge and tail edge are at the same angles to provide a counter clock wise directional air flow, thus inducing the water to flow counter clockwise for maximum oxygen transfer, mixing and agitation of the liquid. These bands 40 are easily replaced if damaged. The required reaction impact combined with infusion of air by the forced air from the plenum 20 provides the needed oxidation treatment to the liquids before leaving the tank 4. In one aspect, the tank 4 is built to maximize the amount of aeration in the smallest size system.

Figure 7:
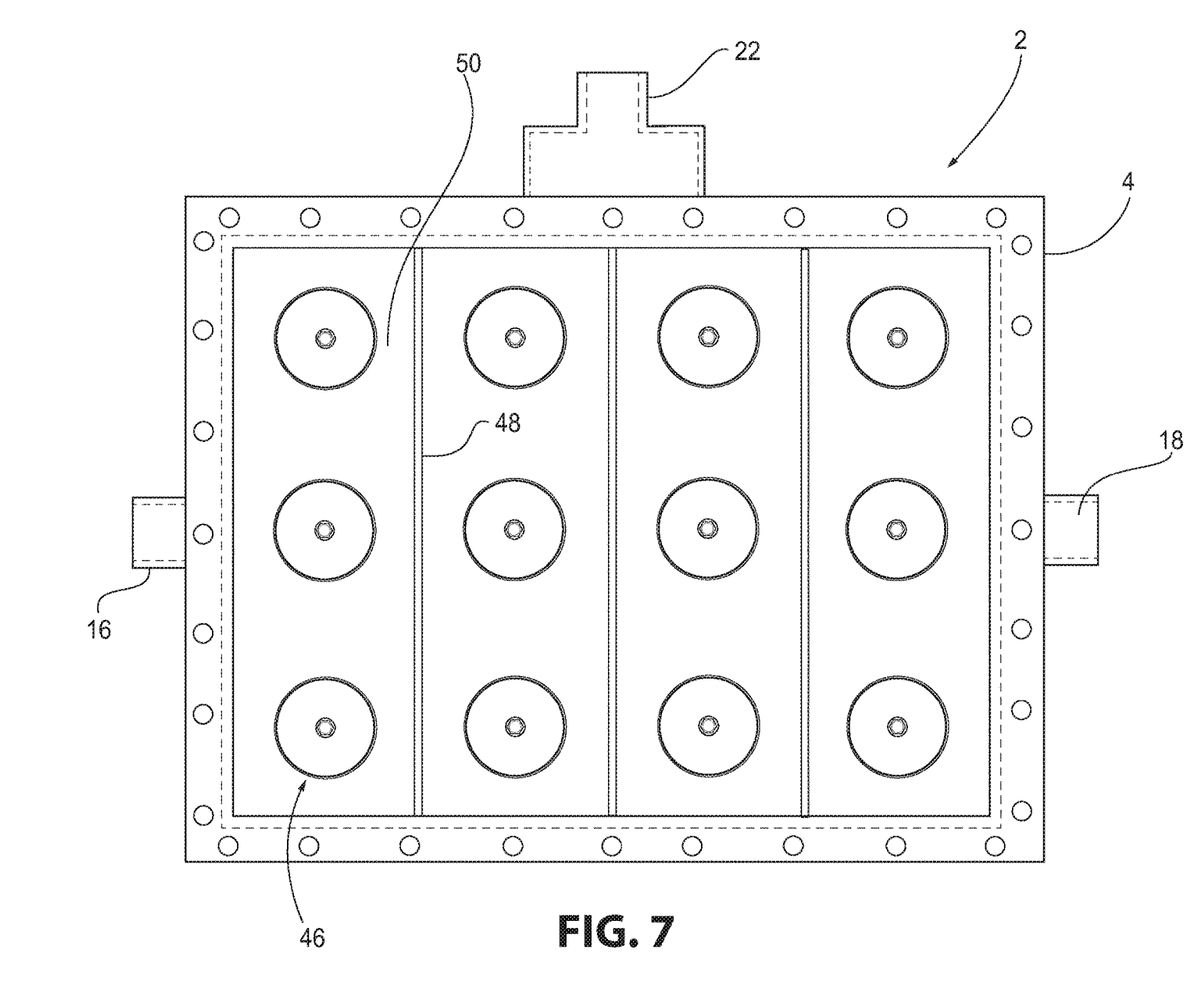
FIG. 7 is a plan view of an aeration apparatus according to another aspect of the present application.
Figure 8:
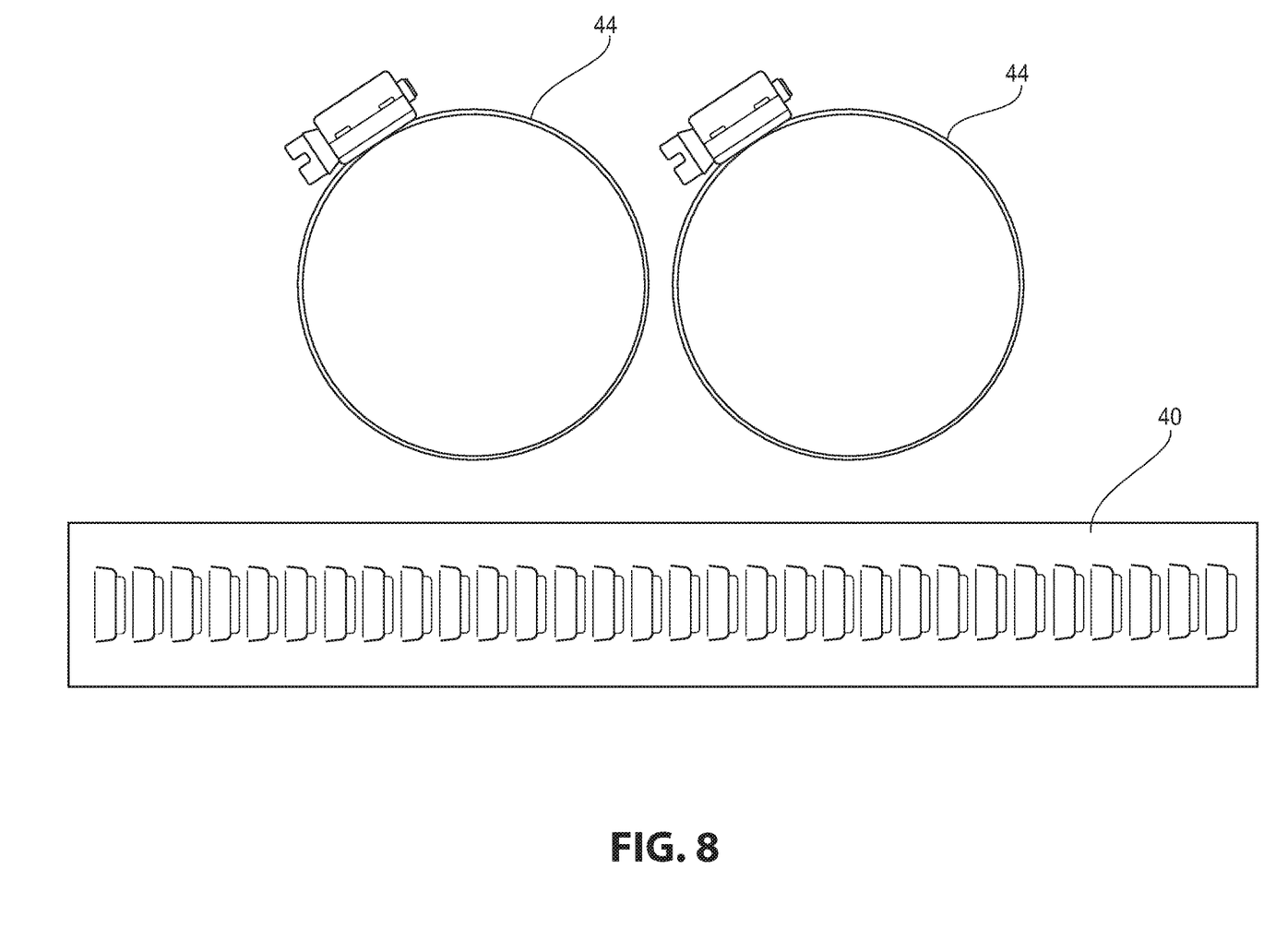
FIG. 8 is a perspective view of components of a flow director arrangement used on the aerator of the present disclosure.

With reference to FIGS. 1 and 7, a plurality of aerators 46, each including an inner delivery tube 24 and an outer aeration tube 38, may be separated by compartment walls 48 (which may also be referred to as baffles) within the tank 4 to define separate reaction chambers 50 and non-aeration chambers 52. In one aspect, each reaction chamber 50 includes at least three aerators 46. The aerators 46 expel continuous high volume, low pressure air into the liquid in the reaction chamber 50 in a predetermined upward canted radial flow. The aerators 46 may be arranged in each reaction chamber 50 in a straight line. In one aspect, the aerators 46 are separated approximately 22 inches apart, measured center to center. In one aspect, the aerators 46 may be spaced approximately 4 inches from the walls of the respective reaction chamber 50. The aerators 46 allow the entrance of forced air in the reaction chambers 50 at a nominal rate of 80-100 cubic feet per minute (cfm), of high volume and low pressure. In one aspect, the aerators 46 are constructed of HDPV pipe, which is durable and resistant against corrosive material. Injecting air into the tank 4 by the aerators 46 causes the air bubbles to vigorously push through the liquid, creating a chemical reaction with the water molecules. The reaction causes the oxygen content in the water to raise to the highest absorption rate possible with the fluid. The impact of the aerated fluid against the sides of the reaction chamber 50, the thrust of colliding flows created by additional aerators 46 within the same reaction chamber 50, the upward direction of the expelled air, and the turbulence and upheaval caused by large volumes of air combines to transfer oxygen into the liquid. The directional flow of liquid created in the tank 4 also greatly contributes to the aeration process. All liquid passing through the tank 4 becomes equally treated throughout this process.

The compartment walls 48 may be interconnected to the sidewalls 10, 12 of the tank 4. The compartment walls 48 may be made of wood, plastic, metal, such as steel, or any other suitably rigid material. In one aspect, four compartment walls 48 are provided in the aeration apparatus 2. In another aspect of the disclosure, three compartment walls 48 may be used in the aeration apparatus 2. It is to be understood, however, more or fewer compartment walls may be provided in the aeration apparatus 2 according to the needs of the worksite. The compartment walls 48 may extend from a top surface of the tank 4 to a position above the bottom surface 14 of the tank 4. The compartment walls 38 may extend from the bottom surface 14 of the tank 4 to a position underneath the top surface of the tank 4. In one aspect, the compartment walls 48 may alternate such that a first compartment wall 48 extends from a top surface of the tank 4 to a position above the bottom surface 14 of the tank 4 and a second compartment wall 48 extends from the bottom surface 14 of the tank 4 to a position underneath the top surface of the tank 4.

With reference to FIG. 2, an aeration process of the aeration apparatus 2 is described. The gravity flow of liquid B, from the inlet port 16 into a first non-aeration chamber 52a, forces the liquid to flow over a first compartment wall 48a and into a first reaction chamber 50a. The inlet port 16 allows entry of liquids with various volumes from as little as 100 gallons per minute to thousands of gallons per minute, under gravity flow, to enter the first non-aeration chamber 52a. The liquid is aerated by the aerators 46 in the first reaction chamber 50a and flows under a second compartment wall 48b. The scroll blower 26 directs an air flow in the plenum 20 to direct the air flow into the aerators 46. The air flow A is directed from the plenum 20 into the inner delivery tube 24 of the aerators 46. The air flow A is then directed from the inner delivery tube 24 into the outer aeration tube 32 of the aerators 46. The air flow A is then directed out of the outer aeration tube 32 via the flow-directing band 40 to create a swirl in the liquid. The liquid flow B then moves upward through a second non-aeration chamber 52b and over a third compartment wall 48c into a second reaction chamber 50b. As the liquid flow B is moved through the second reaction chamber 50b, the aerators 46 direct air flow A into the liquid to aerate the liquid. The liquid flow B is then directed underneath a fourth compartment wall 48d into a third reaction chamber 50c. Aerators 46 within the third reaction chamber 50c direct air flow A into the liquid to aerate the liquid. The liquid flow B is then directed upwards to flow out of the outlet port 18. The flow pattern of liquid under, over, and under the compartment walls, from the first chamber to the last chamber creates a directed and structured flow of liquid as shown with the arrows in FIG. 2. The spinning or swirling action of the liquid in each reaction chamber 50 further accelerates oxygen intake and absorption by maximizing the air reaction time in the reaction chamber 50. As shown in FIG. 7, for example, according to some design requirements four (4) aeration chambers are included in a tank. However, it is to be understood that the total number of reaction chambers and aeration tubes can be adjusted based on the chemistry of the liquid being treated.

One objective of the aeration apparatus 2 is to provide an apparatus to effectively transfer into any liquid any desired amount of oxygen the process or worksite may require. The oxidation and precipitation of ferrous iron from acidic water requires one milligram of oxygen for every seven milligrams of iron. Treatment of acidic water containing one thousand milligrams per liter of iron requires one hundred forty-three milligrams per liter of oxygen. When nine milligrams of oxygen equals saturation of water, complete oxidation of one thousand milligrams of iron per liter requires fifteen times saturation. A continuous series of aeration apparatuses can process continuous flow having high oxygen demand by transferring oxygen into the same water several times as it passes through successive reaction chambers. Continuous gravity flow treatment eliminates the need for pumps or recycling and low pressure, high volume air which reduces energy consumption, combine to make this a low cost effective apparatus for high oxygen demand processes.

Another objective of this apparatus is to provide lower and more effective operating costs. This is accomplished through decreased energy consumption and lowered maintenance costs. Other systems such as the fine bubble diffuser, sparging ring, and surface aerator all have a high energy and maintenance requirement. The present aeration apparatus 2 provides a reduction in the chemicals needed to treat the liquid or totally chemical free means to oxygenate water for effective precipitation of dissolved metals through a natural neutralization process. Another objective of this apparatus is to create the agitation and turbulence necessary to keep precipitated solids in suspension.

As liquids or chemicals are added to induce specific precipitation, the aeration module, through continual agitation, and infusion of air will prevent laminar flow and allow complete mixing of added chemicals. Chemical reagents, should they be needed, can be introduced more easily into this process, and provide more effective mixing and lower treatment costs.

The design of this aeration apparatus 2 is effective for municipal water treatment, as it allows the required air to infuse needed oxygen into sewage waste water, providing the required environment for effective aerobic bacterial action and sludge removal.

A further and more precise function of this aeration apparatus 2 is to provide for the economical removal of volatile organic compounds from liquids. Many processes treating liquids containing volatile organic compounds must recycle the liquid to reduce the amount of volatile organic compounds to acceptable limits. The present aeration apparatus 2 is capable of aerating the same liquid repeatedly in successive modules as the liquid flows through the successive modules by receiving large volumes of air from the manifold of a single source.

Another function of this aeration apparatus 2 is that it not only can receive liquids for mixing, but receive granular chemical reagents directly into the aerator as pneumatically conveyed from the source of air and expel it into liquids for efficient mixing. This aeration apparatus 2 can adjust the pH content of a liquid in a single pass by mixing acids and bases in separate successive reaction chambers and provide each with adequate retention time and optimize their individual reactions while eliminating pumps and mixers.

Another key function of the aerator is to provide a means to strip gasses and volatile organic compounds from liquids and gases. The aerator provides the injection of air allowing oxygen as the primary element to manipulate pH, oxygenation and precipitation of metals, agitation to keep precipitated solids and metals in suspension and for performing all cost effective and accelerated natural means with continuous flowing liquid in a single pass without pumps or mixers.

While various aspects of the aeration apparatus 2 were provided in the foregoing description, those skilled in the art may make modifications and alterations to these aspects without departing from the scope and spirit of the invention. For example, it is to be understood that this disclosure contemplates that, to the extent possible, one or more features of any aspect can be combined with one or more features of any other aspect. Accordingly, the foregoing description is intended to be illustrative rather than restrictive. The invention described hereinabove is defined by the appended claims and all changes to the invention that fall within the meaning and the range of equivalency of the claims are to be embraced within their scope.

The invention claimed is:

1. An aeration apparatus, comprising:
a tank defining a cavity to receive a liquid;
at least one aerator positioned within the tank; and
a plenum connected to a bottom surface of the tank and in fluid communication with the at least one aerator,
wherein an air flow is directed from the plenum into the at least one aerator to deliver air to the liquid in the tank to oxidize the fluid, and
wherein the at least one aerator comprises an inner delivery tube and an outer aeration tube.

2. The aeration apparatus as claimed in claim 1, wherein the inner delivery tube is connected to a hole defined in the bottom surface of the tank to establish fluid communication with the plenum.

3. The aeration apparatus as claimed in claim 1, wherein the inner delivery tube defines at least one aperture to establish fluid communication between the plenum and the outer aeration tube.

4. The aeration apparatus as claimed in claim 3, wherein the at least one aperture is defined in a top end of the inner delivery tube.

5. The aeration apparatus as claimed in claim 1, wherein a flow-directing band is positioned on the outer aeration tube to create a counter-clockwise swirl in the liquid surrounding the outer aeration tube.

6. The aeration apparatus as claimed in claim 1, wherein the outer aeration tube is connected to the inner delivery tube via a cap and stud arrangement.

7. The aeration apparatus as claimed in claim 1, wherein the outer aeration tube is welded to the bottom surface of the tank.

8. An aeration apparatus, comprising:
a tank defining a cavity to receive a volume of liquid, wherein the cavity is exposed to atmospheric pressure;
at least one compartment wall positioned within the tank to define a reaction chamber therein;
at least one aerator positioned within the reaction chamber; and
a plenum connected to the tank and fluidly connected to the at least one aerator.

9. The aeration apparatus as claimed in claim 8, wherein the at least one compartment wall comprises a first compartment wall and a second compartment wall defining the reaction chamber therebetween.

10. The aeration apparatus as claimed in claim 9,
wherein the first compartment wall extends from a bottom surface of the tank; and
wherein the second compartment wall extends from a top surface of the tank.

11. The aeration apparatus as claimed in claim 8, further comprising an aeration source fluidly connected to the plenum to direct an air flow into the plenum.

12. The aeration apparatus as claimed in claim 8, wherein the aeration apparatus is portable between different locations or worksites.

13. The aeration apparatus as claimed in claim 8, wherein a non-aeration chamber is defined between the at least one compartment wall and a sidewall of the tank.

14. The aeration apparatus as claimed in claim 8, wherein the at least one aerator comprises an inner delivery tube and an outer aeration tube.

15. The aeration apparatus as claimed in claim 8, wherein the at least one aerator comprises a flow-directing band to create a counter clockwise swirl in the liquid surrounding the at least one aerator.

16. The aeration apparatus as claimed in claim 8, wherein the at least one aerator comprises three aerators arranged in a line within the reaction chamber.

17. An aeration apparatus, comprising:
a tank defining a cavity to receive a liquid;
at least one aerator positioned within the tank; and
a plenum connected to a bottom surface of the tank and in fluid communication with the at least one aerator,
wherein an air flow is directed from the plenum into the at least one aerator to deliver air to the liquid in the tank to oxidize the fluid, and
wherein the at least one aerator comprises an inner delivery tube and an outer aeration tube, in which the outer aeration tube encloses the entire inner delivery tube.

* * * * *